US012384705B2

United States Patent
Myers et al.

(10) Patent No.: US 12,384,705 B2
(45) Date of Patent: Aug. 12, 2025

(54) BIOELECTROCHEMICAL SYSTEM FOR WATER DEIONIZATION AND DESALINATION, WASTEWATER TREATMENT AND ENERGY RECOVERY

(71) Applicant: San Diego State University (SDSU) Foundation, San Diego, CA (US)

(72) Inventors: Tyler Myers, San Diego, CA (US); Christine M. Dykstra, San Diego, CA (US)

(73) Assignee: San Diego State University (SDSU) Foundation, San Diego, CA (US)

( * ) Notice: Subject to any disclaimer, the term of this patent is extended or adjusted under 35 U.S.C. 154(b) by 455 days.

(21) Appl. No.: 17/952,157

(22) Filed: Sep. 23, 2022

(65) Prior Publication Data

US 2024/0101453 A1   Mar. 28, 2024

Related U.S. Application Data

(60) Provisional application No. 63/247,475, filed on Sep. 23, 2021.

(51) Int. Cl.
*C02F 3/00* (2023.01)
*C02F 1/46* (2023.01)
(Continued)

(52) U.S. Cl.
CPC ............ *C02F 3/005* (2013.01); *C02F 1/4693* (2013.01); *C02F 3/341* (2013.01);
(Continued)

(58) Field of Classification Search
CPC ........ C02F 3/005; C02F 1/4693; C02F 3/341; C02F 2103/08; C02F 2201/003; C02F 2201/46115; C02F 2203/006
(Continued)

(56) References Cited

U.S. PATENT DOCUMENTS

2014/0069806 A1 * 3/2014 Silver ................ C25B 1/02
204/242

FOREIGN PATENT DOCUMENTS

CN   102408155 A  *  4/2012   ............... C25B 3/25
CN   111807503 A  *  10/2020
(Continued)

OTHER PUBLICATIONS

Machine-generated English translation of CN 113248006, generated on Feb. 13, 2025.*
(Continued)

*Primary Examiner* — Fred Prince
(74) *Attorney, Agent, or Firm* — Gregory P. Einhorn; Greer, Burns & Crain, Ltd.

(57) ABSTRACT

In alternative embodiments, provided are BioElectrochemical Systems (BESs) and methods using them for removing ionic compounds from water, treating organics in wastewater, and for energy recovery from the conversion of $CO_2$ to $CH_4$ in an anaerobic setting, for example, for biogas upgrading, or the production of $H_2$ from water electrolysis. In alternative embodiments, provided are products of manufacture that are anoxic BioElectrochemical Systems (BES) for ion removal, energy recovery by the conversion of $CO_2$ to $CH_4$, or by the production of $H_2$ from water electrolysis wastewater treatment and/or biogas upgrading of $CO_2$ to $CH_4$. In alternative embodiments, a bioanode is inoculated with an engineered microbial community of natural occurring bacteria in the site wastewater. In alternative embodiments, the biocathode is inoculated with a methanogenic community or engineered microbes for chemical reduction and/or plastic degradation.

25 Claims, 9 Drawing Sheets

(51) Int. Cl.
   *C02F 1/469* (2023.01)
   *C02F 3/34* (2023.01)
   *C02F 103/08* (2006.01)

(52) U.S. Cl.
   CPC .... *C02F 2103/08* (2013.01); *C02F 2201/003* (2013.01); *C02F 2201/46115* (2013.01); *C02F 2203/006* (2013.01)

(58) Field of Classification Search
   USPC ............................... 210/603, 605, 252, 259
   See application file for complete search history.

(56) References Cited

FOREIGN PATENT DOCUMENTS

| CN | 110316913 B | * | 3/2021 | ............ C02F 1/4604 |
|---|---|---|---|---|
| CN | 113248006 A | * | 8/2021 | |
| EP | 3527538 A1 | * | 8/2019 | .............. C02F 3/005 |
| KR | 101284554 B1 | * | 7/2013 | |
| WO | WO-2011062485 A2 | * | 5/2011 | .............. B01D 61/44 |
| WO | WO-2012054629 A2 | * | 4/2012 | ................ C25B 1/00 |
| WO | WO-2020053529 A1 | * | 3/2020 | .............. C02F 1/461 |

OTHER PUBLICATIONS

Machine-generated English translation of CN 110316913, generated on Feb. 13, 2025.*
Machine-generated English translation of CN 111807503, generated on Feb. 13, 2025.*
Machine-generated English translation of WO 2020053529, generated on Feb. 13, 2025.*
Machine-generated English translation of KR 101284554, generated on Feb. 13, 2025.*
Machine-generated English translation of CN 102408155, generated on Jul. 1, 2025.*
Dykstra, C., et al., "Comparison of Carbon Dioxide with Anaerobic Digester Biogas as a Methanogenic Biocathode Feedstock", Environmental Science and Technology, Jun. 16, 2020, pp. 8949-8957, vol. 54.
Dykstra, C., et al., "Hydrogen sulfide affects the performance of a methanogenic bioelectrochemical system used for biogas upgrading", Water Research 200, May 14, 2021, pp. 1-9, vol. 117268.
Dykstra, C., et al., "Zero-Valent Iron Enhances Biocathodic Carbon Dioxide Reduction to Methane", Environmental Science and Technology, Oct. 10, 2017, pp. 12956-12964, vol. 51.
Dykstra, C., et al., "Methanogenic Biocathode Microbial Community Development and the Role of Bacteria", nvironomental Science and Technology, Apr. 3, 2017, pp. 5306-5316, vol. 51.
Dykstra, C., et al., "Evaluation of Gas and Carbon Transport in a Methanogenic Bioelectrochemical System (BES)" Biotechnology and Bioengineering, May 2017, pp. 961-969, vol. 114, No. 5.
Ngoumelah, D., et al., "Effect of model methanogens on the electrochemical activity, stability, and microbial community structure of *Geobacter* spp. dominated biofilm anodes", npj Biofilms and Microbiomes, Mar. 5, 2024, pp. 1-13, vol. 10, No. 17.

* cited by examiner

FIG. 4A-B

FIG. 8A-B
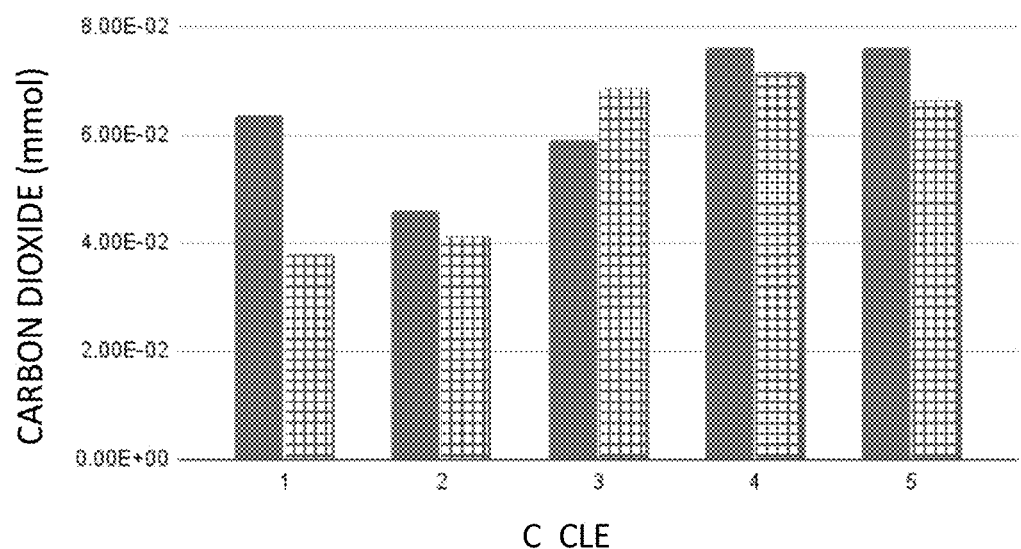
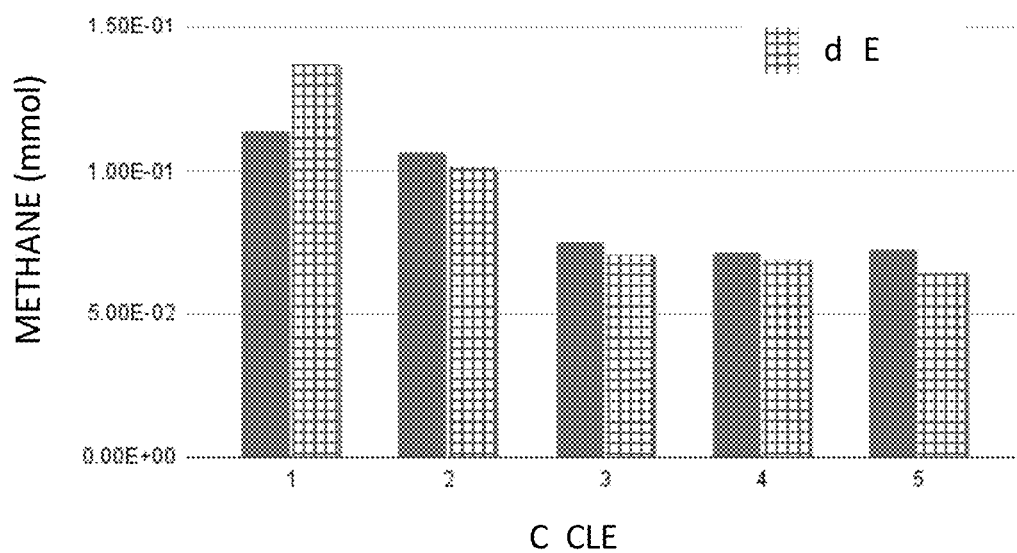

BIOELECTROCHEMICAL SYSTEM FOR WATER DEIONIZATION AND DESALINATION, WASTEWATER TREATMENT AND ENERGY RECOVERY

RELATED APPLICATIONS

This U.S. Utility patent application claims the benefit of priority under 35 U.S.C. § 119(e) of U.S. Provisional Application Ser. No. (USSN) 63/247,475, filed Sep. 23, 2021. The aforementioned application is expressly incorporated herein by reference in its entirety and for all purposes.

TECHNICAL FIELD

This invention generally relates to the fields of bioremediation, wastewater treatment, bioelectrochemical systems, and water desalination. Specifically, provided are BioElectrochemical Systems (BESs) and methods using them for removing ionic compounds from water, treating organics in wastewater, and for energy recovery from the conversion of $CO_2$ to $CH_4$ in an anaerobic setting, for example, for biogas upgrading, or the production of $H_2$ from water electrolysis. In alternative embodiments, provided are products of manufacture that are anoxic BioElectrochemical Systems (BES) for ion removal, energy recovery by the conversion of $CO_2$ to $CH_4$, or by the production of $H_2$ from water electrolysis wastewater treatment and/or biogas upgrading of $CO_2$ to $CH_4$. In alternative embodiments, a bioanode is inoculated with an engineered microbial community of natural occurring bacteria in the site wastewater. In alternative embodiments, the biocathode is inoculated with a methanogenic community or engineered microbes for chemical reduction and/or plastic degradation.

BACKGROUND

A BioElectrochemical System (BES) uses living microbial communities (for example, *Bacteria, Archaea*) and tailors a bioreactor environment to promote processes such as the generation of current, microbial metabolisms, the production of electrochemically active proteins and/or redox reactions.

Many BESs lack the utilization of multiple selective membranes and novel configurations for methods like desalination and contamination removal and concentration. Additionally, aerobic systems that exist use oxygen from ambient air as the main electron acceptor, whereas electron conservation may be better achieved in hypoxic or anoxic conditions. Therefore, what is needed are systems and techniques that overcome the above-mentioned disadvantages.

SUMMARY

In alternative embodiments, provided are products of manufacture that are anoxic and/or anaerobic BioElectrochemical Systems (BESs) for water deionization and desalination, and/or wastewater treatment, and/or production of a chemically-reduced cathode product, such as $CH_4$ from $CO_2$. In alternative embodiments, a bioanode is inoculated with an engineered microbial community of exoelectrogenic microbes or with natural occurring microbes in the site wastewater. In alternative embodiments, the biocathode is inoculated with a methanogenic community, a mixed microbial community, cultures containing exoelectrogenic, methanogenic, or other species, or engineered microbes for enhanced system performance.

In alternative embodiments, provided are products of manufacture that are anaerobic BioElectrochemical Systems (BESs) for salt water desalination, wastewater treatment and/or conversion of $CO_2$ to $CH_4$. In alternative embodiments, a bioanode is inoculated with an engineered microbial community of natural occurring bacteria in the site wastewater.

In alternative embodiments, the biocathode is inoculated with a methanogenic community or engineered microbes for plastic degradation. The cathode may also be abiotic for simplicity of design. In alternative embodiments, the BES as provided herein comprises a middle desalination chamber that can be separated from the anode via an anion exchange membrane, or equivalent, and can be separated from the cathode via a proton exchange membrane, or equivalent. In alternative embodiments, an applied voltage is applied across the reactor for enhancing the desalination or biological processes. In alternative embodiments, the BES systems as provided herein are a batch system or continuous flow system.

In alternative embodiments, provided are methods for oxidizing a raw or pretreated wastewater through a biological or microbial community in an anode for the use of biogas upgrading in a biocathode and/or the removal of ions in a chamber separated by a membrane(s), comprising use of a product of manufacture, system or apparatus as provided herein.

In alternative embodiments, provided are methods for oxidizing a raw or pretreated wastewater using a biological or microbial community in an anode, and for the use of $CO_2$ conversion to $CH_4$ in a biocathode, and/or the removal of ions in a chamber separated by a membrane(s), comprising use of a product of manufacture, system or apparatus as provided herein.

In alternative embodiments, provided are methods for oxidizing the raw or pretreated wastewater through a biological or microbial community in an anode and for the removal of ions in a chamber separated by a membrane(s), using an abiotic cathode, comprising use of a product of manufacture, system or apparatus as provided herein.

In alternative embodiments, provided are methods for oxidizing the raw or pretreated wastewater through a biological or microbial community in an anode for the use of biogas upgrading and/or $CO_2$ conversion to $CH_4$ in a biocathode and/or the concentration of ions in a chamber separated by a membrane(s), comprising use of a product of manufacture, system or apparatus as provided herein.

In alternative embodiments, provided are methods for oxidizing the raw or pretreated wastewater through a biological or microbial community in an anode for the concentration of ions in a chamber separated by a membrane(s), using an abiotic cathode, comprising use of a product of manufacture, system or apparatus as provided herein.

In alternative embodiments, provided are products of manufacture, a system or an apparatus as set forth in FIG. 1, comprising an anode chamber, an ion removal chamber and a cathode chamber, wherein the product of manufacture, system or apparatus has an ion removal configuration wherein an anion exchange membrane (AEM) is at an anode interface with the ion removal chamber and a cation exchange membrane (CEM) at a cathode interface with the ion removal chamber resulting in anions selectively flowing or migrating into the anode chamber and cations selectively flowing or migrating into the cathode chamber, thereby concentrating anions in the anode chamber and cations in the cathode chamber, wherein the anode chamber and the cathode chamber comprises a biological or a microbial community, and optionally the biological or microbial community comprises a plurality of living microbes, and optionally the plurality of living microbes comprise living *Bacteria* and/or *Archaea*, and optionally the biological or microbial community comprises methanogenic *Bacteria* and/or *Archaea*, wherein the capture of electrons by the plurality of living microbes in the cathode chamber reduces $CO_2$ to $CH_4$, wherein the anode chamber organic compounds are oxidized into biomass and $CO_2$, wherein a wastewater (optionally treated or untreated, or raw or pretreated wastewater, or diluted or undiluted wastewater) flows into the anode chamber and treated water flows out of the anode chamber, wherein a catholyte is flowed into the cathode chamber and $CH_4$ biofuel flows out of the cathode chamber, wherein optionally input for the ion removal chamber comprises brackish water, seawater, saline water or a wastewater (optionally treated or untreated), and output from the ion removal chamber comprises deionized and/or desalinated water.

In alternative embodiments, provided are products of manufacture, a system or an apparatus as set forth in FIG. 2, comprising an anode chamber, an ion collection chamber and a cathode chamber, wherein the product of manufacture, system or apparatus has an ion removal configuration wherein an anion exchange membrane (AEM) is at a cathode interface with the ion collection chamber and a cation exchange membrane (CEM) at an anode interface with the ion collection chamber resulting in anions and cations selectively flowing or migrating into the ion collection chamber, thereby concentrating ions in the ion collection chamber, wherein the anode chamber and the cathode chamber comprises a biological or a microbial community, and optionally the biological or microbial community comprises a plurality of living microbes, and optionally the plurality of living microbes comprise living *Bacteria* and/or *Archaea*, and optionally the microbial community comprises methanogenic *Bacteria* and/or *Archaea*, wherein the capture of electrons by the plurality of living microbes in the cathode chamber reduces $CO_2$ to $CH_4$, wherein the anode chamber organic compounds are oxidized into biomass and $CO_2$, wherein a wastewater (optionally treated or untreated, or raw or pretreated wastewater, or diluted or undiluted wastewater) flows into the anode chamber and treated water flows out of the anode chamber, wherein a catholyte is flowed into the cathode chamber and $CH_4$ biofuel flows out of the cathode chamber, wherein optionally input for the ion collection chamber comprises brackish water, seawater, saline water or a wastewater (optionally treated or untreated), and output from the ion collection chamber comprises concentrated ions.

In alternative embodiments of products of manufacture, systems or apparatus as provided herein:

wherein optionally the cathode is held at a constant electrical potential, or a substantially constant electrical potential, and the product of manufacture, system or apparatus comprises and is operably linked to (to maintain a substantially constant cathode potential) a potentiostat or any instrument designed to control the working electrode's potential in the electrode electrochemical cell, and a power supply or a photovoltaics device, or the product of manufacture, system or apparatus comprises a connection to an electrical grid to supply power to maintain a substantially constant electrical potential, and optionally the product of manufacture, system or apparatus runs, or is configured to set to run or operate, at operating voltages comprising:
(i) a cathode potential ranging from between about −0.2 V vs. Ag/AgCl to about −1.5 V vs. Ag/AgCl, optionally having an operating potential of about −0.7 V vs. Ag/AgCl, −0.6 V vs. Ag/AgCl or −0.5 V vs. Ag/AgCl;
(ii) an anode potential ranging from between about 0.0 V vs. Ag/AgCl to about 2.5 V vs. Ag/AgCl, optionally having an operating potential of about 1.2 V vs. Ag/AgCl, 1.1 V vs. Ag/AgCl or 1.3 V vs. Ag/AgCl; and/or
(iii) a cell potential ranging from between about 0.2 V to 5.0 V, optionally having an operating potential of about 2.5 V, 2.4 V, 2.6 V, 2.3 V or 2.7 V.

In alternative embodiments the products of manufacture, systems or apparatus as provided herein are connected directly or remotely to a computer system configured to control and operate BES, optionally comprising controls to modify the cathode potential, the anode potential and/or the cell potential.

In alternative embodiments, provided are methods for oxidizing raw or pretreated wastewater comprising:
contacting raw or pretreated wastewater with a biological or microbial community in an anode environment using a product of manufacture, system or apparatus as provided herein,
wherein the biological or microbial community comprises a plurality of living microbes, and optionally the plurality of living microbes comprise *Bacteria* and/or *Archaea*,
and biogas or $CO_2$ is upgraded to generate $CH_4$ or biofuel in a biocathode and/or the removal of ions in a chamber separated by a membrane(s).

In alternative embodiments, provided are methods for oxidizing raw or pretreated wastewater through a biological or microbial community in an anode for the use of chemical reduction in a biocathode and/or the removal of ions in a chamber separated by a membrane(s) comprising:
contacting raw or pretreated wastewater with a biological or microbial community in an anode environment using a product of manufacture, system or apparatus as provided herein.

In alternative embodiments, provided are methods for oxidizing the raw or pretreated wastewater through a biological or microbial community in an anode for the removal of ions in a chamber separated by a membrane(s), comprising:
contacting raw or pretreated wastewater with a biological or microbial community in an anode environment using a product of manufacture, system or apparatus as provided herein.

In alternative embodiments, provided are methods for oxidizing the raw or pretreated wastewater through a biological or microbial community in an anode for the use of biogas upgrading in a biocathode and/or the concentration of ions in a chamber separated by a membrane(s) comprising:
contacting raw or pretreated wastewater with a biological or microbial community in an anode environment using a product of manufacture, system or apparatus as provided herein.

In alternative embodiments, provided are methods for oxidizing the raw or pretreated wastewater through a biological or microbial community in an anode for the concentration of ions in a chamber separated by a membrane(s), comprising:
    contacting raw or pretreated wastewater with a biological or microbial community in an anode environment using a product of manufacture, system or apparatus as provided herein.
In alternative embodiments of devices as provided herein:
a mixed culture of *bacteria* and/or *Archaea* is in the anode;
a mixed culture of *bacteria* and/or *Archaea* is in the cathode;
a pure culture, or substantially pure culture, of *bacteria* or *Archaea* are in the anode (wherein substantially is between about 90% and 99% pure);
a pure culture, or substantially pure culture, of *bacteria* or *Archaea* are in the cathode (wherein substantially is between about 90% and 99% pure);
the anode oxidizes a wastewater, or the anode oxidizes a solution comprising wastewater, or substantially comprising a wastewater (wherein substantially is between about 90% and 99%);
the anode oxidizes a chemical, or the anode oxidizes a solution comprising a chemical, or substantially comprising a chemical (wherein substantially is between about 90% and 99%);
the cathode produces methane ($CH_4$) from carbon dioxide ($CO_2$);
the cathode produces hydrogen gas, or $H_2$, from water electrolysis;
the cathode produces a carbon-based compound, optionally an alkane or an alkene or an alcohol, or methanol, acetate, methane, ethane, ethanol, butanol, butane, and the like;
the cathode produces ammonium, ethylamine, mehylamine or any nitrogen-based compound;
the ion removal chamber removes ions with a +1, +2, and/or +3 valence state;
as exemplary BES system as provided herein is operated with or without cation and anion exchange membranes; and/or
the cathode contains or comprises an abiotic catalyst (for example, platinum) for water electrolysis.
Alternative embodiments of devices as provided herein comprise alternative components as listed in Table 1:

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference in their entireties for all purposes.

DESCRIPTION OF DRAWINGS

FIG. 4A graphically illustrates data from a study where $V_{cathode}$ was held constant at −0.8 V vs. Ag/AgCl between day 0 and 56 and $V_{cell}$ was held constant at 2.5 V between day 61 and 75; and FIG. 4B: graphically illustrates the conductivity per cycle (mS/cm) from the study of FIG. 4A, showing the initial (black, or left bar) and final (gray, or right bar) conductivity in the exemplary dBES1 IRC over eleven feeding cycles.

TABLE 1

| Modification | Option 1 | Option 2 | Option 3 | Option 4 |
|---|---|---|---|---|
| Microbial community | Mixed | Pure cultures | — | — |
| Anode product | Oxidized wastewater | $CO_2$ | Oxidized chemical | |
| Cathode product | CH4 | Other C-based compounds (e.g., $CH_3OH$ methanol, acetate ($CH_3COOH$), etc | $H_2$ | $NH_4^+$ or other N-based compounds (e.g., $NH_4OH$, etc.) |
| IRC ions for separation | +1 valence (e.g., NaCl→ $Na^+$ + $Cl^-$) | +2 valence | +3 valence | |
| Membrane | With membrane | Without membrance | | |
| Operation | Batch | Continuous flow | | |
| Biotic or abiotic anode | Biotic | Abiotic | | |
| Biotic or abiotic cathode | Biotic | Abiotic | | |

Figure 6A:
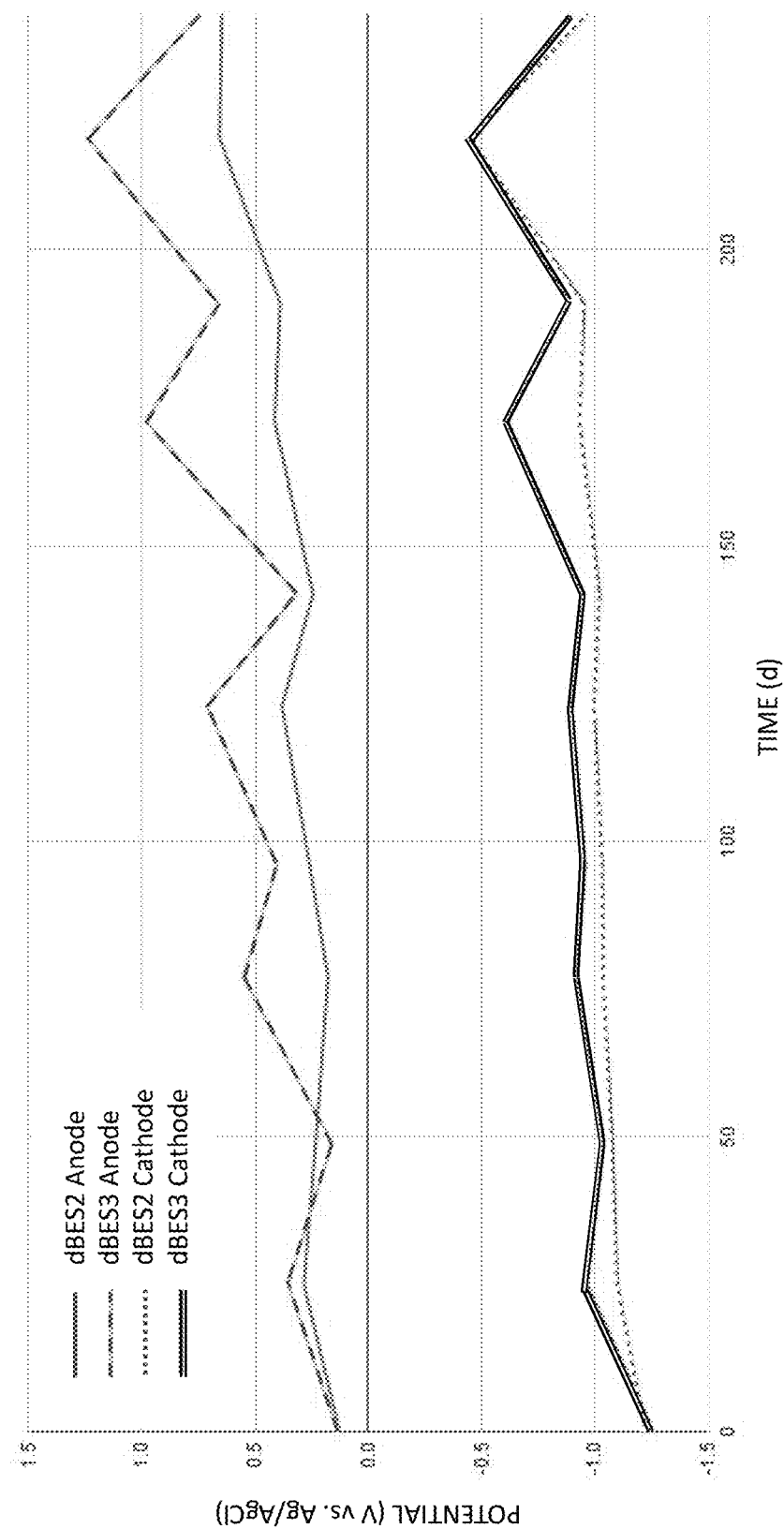
FIG. 6A-B (or FIG. 4A-B of Example 2) graphically illustrate a time series of $V_{anode}$ and $V_{cathode}$ for exemplary dBES2 and dBES3 during operation.
Figure 6B:
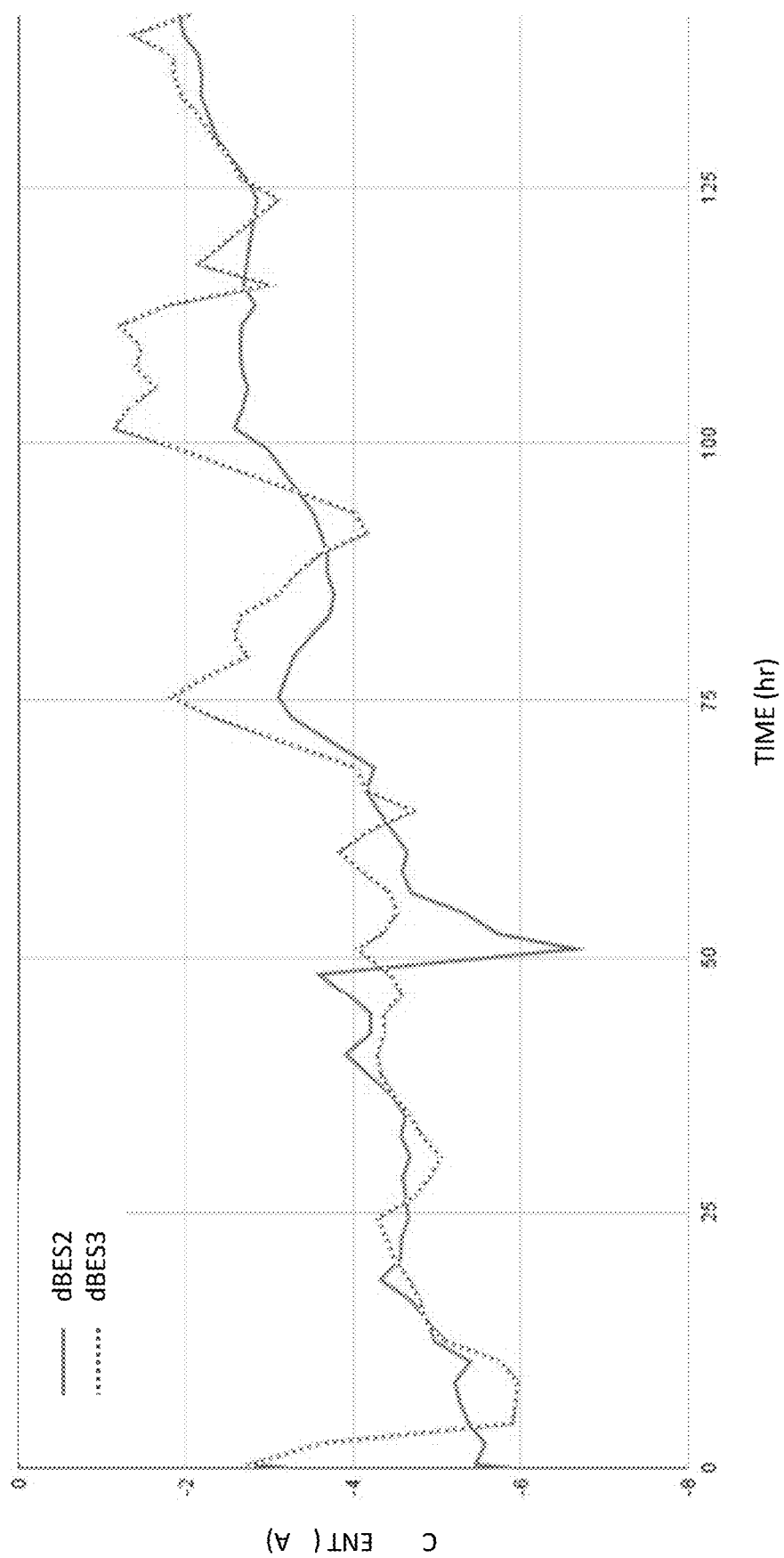

FIG. 6A with a fixed cell potential of 2.5 V (A), with voltage vs Ag/AgCl; and FIG. 6B with a system current, with current in mA as a function of hours;

and feeding and IRC replacement occurred at 0, 50.9, 73.28, 99.48, and 123.85 hours.

Figure 5:
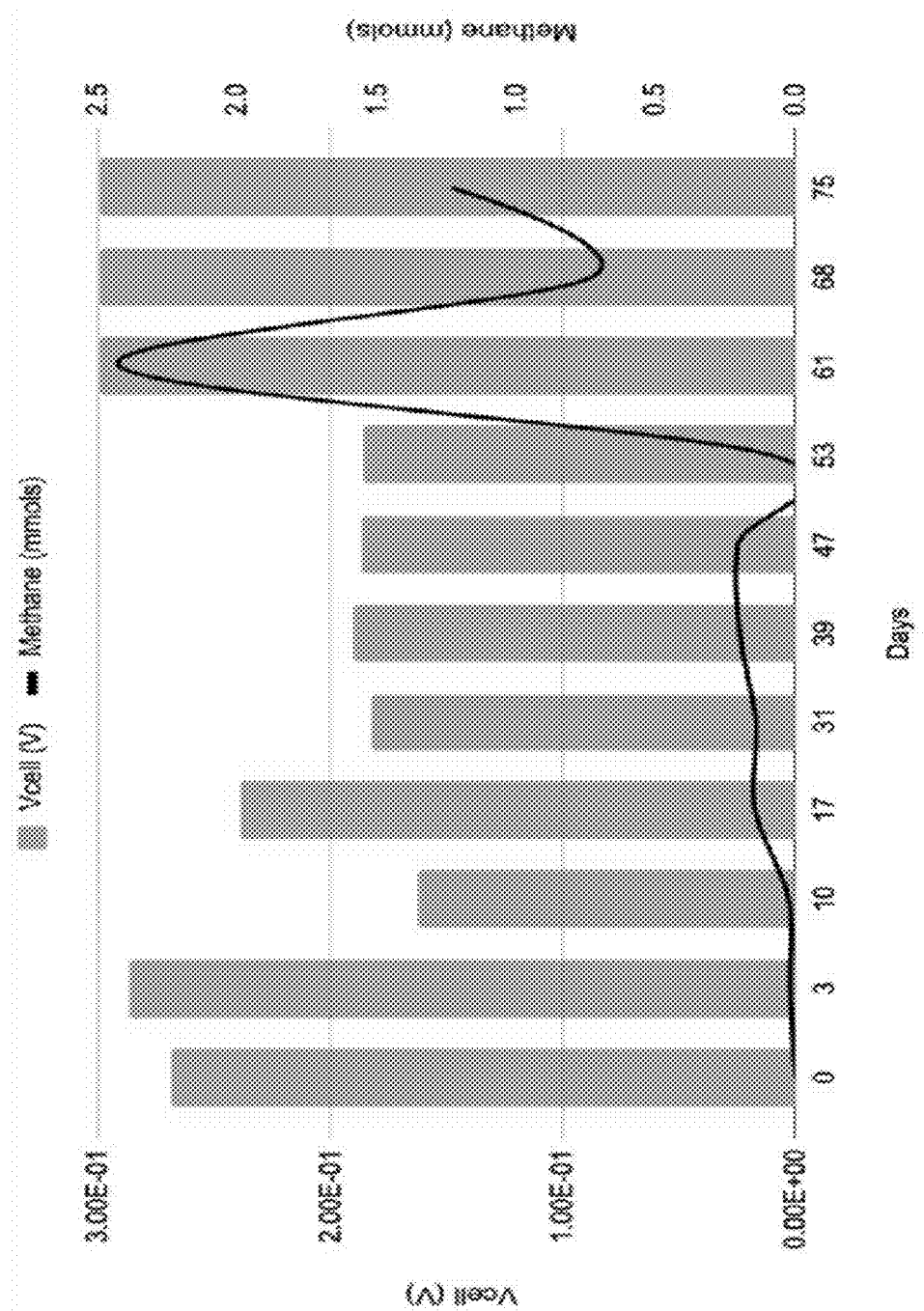
FIG. 5 (or FIG. 3 of Example 2) graphically illustrates a time series of Vcen and biocathode methane production in the exemplary d-BioElectrochemical System-1 (dBES1), showing on the left (using the bars) Vcell as a function of days and on the right methane in mmols (using the line) as a function of days.
Figure 7:
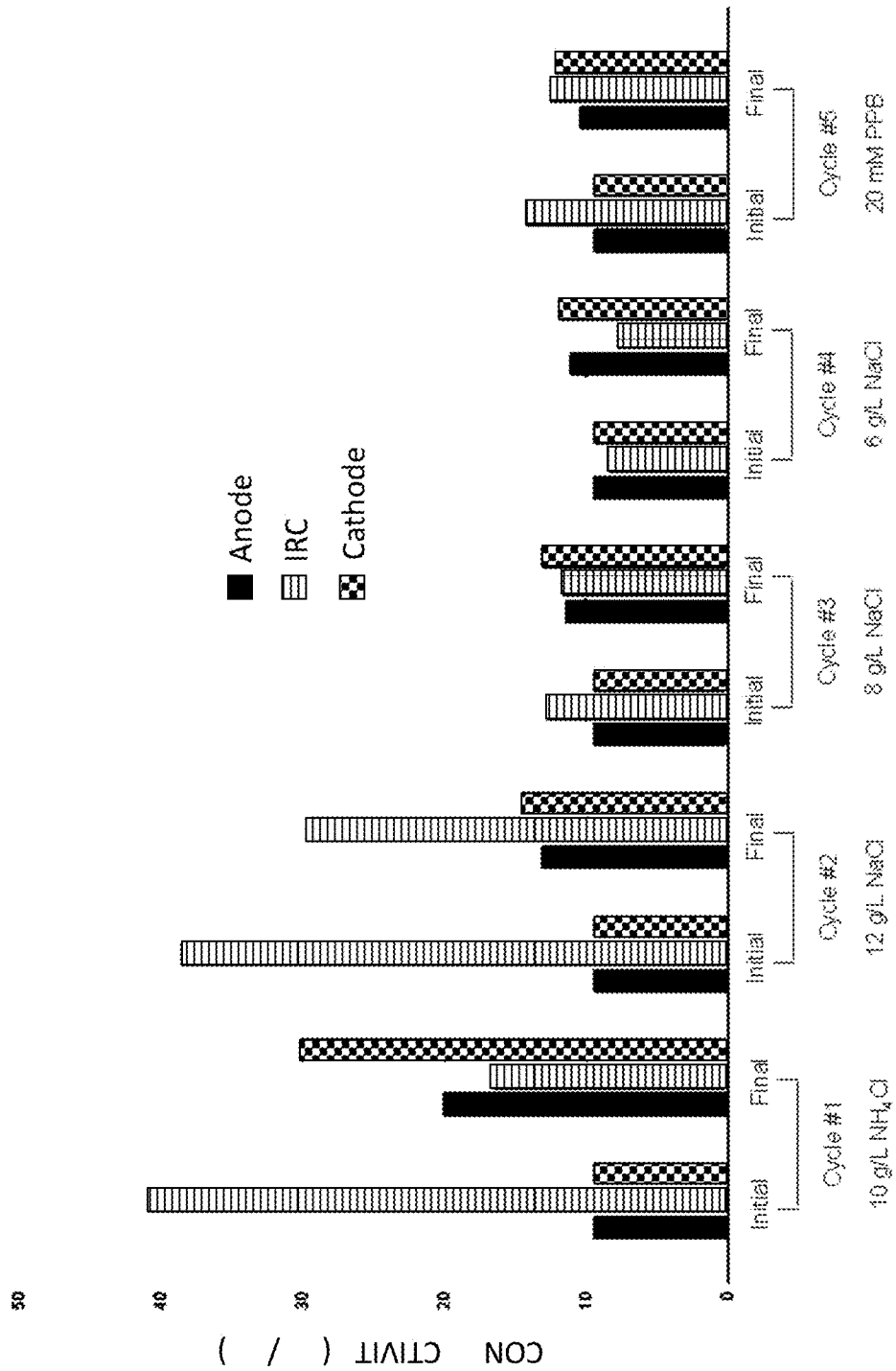

FIG. 7 (or FIG. 5, of Example 2) graphically illustrates average initial and final conductivity for dBES2 and dBES3 feeding cycles with various salts and initial salt concentrations in the IRC: anode conductivity (black, or left, bar); IRC conductivity (hatched-lined, or middle, bar); cathode conductivity (checked, or right, bar), and the IRC contained DI with initial concentrations of 10 g/L $NH_4Cl$ (Cycle #1), 12 g/L NaCl (Cycle #2), 8 g/L NaCl (Cycle #3), 6 g/L NaCl (Cycle #4), or 20 mM phosphate buffer (Cycle #5).

FIG. 8A-B (or FIG. 6A-B of Example 2) graphically illustrate final cathode headspace gas composition for Cycles #1-5, as shown in terms of $CO_2$ (FIG. 8A) and $CH_4$ (FIG. 8B) for dBES2 (blue, or solid shaded, or left bar) and dBES3 (checked, or right bar), with total mmol as a function of days.

The drawings set forth herein are illustrative of exemplary embodiments provided herein and are not meant to limit the scope of the invention as encompassed by the claims.

Like reference symbols in the various drawings indicate like elements.

DETAILED DESCRIPTION

In alternative embodiments, provided are BioElectrochemical Systems (BESs) and methods using them for removing ionic compounds from water, treating organics in wastewater, and for the conversion of $CO_2$ to $CH_4$ in an anaerobic/anoxic setting, and for biogas upgrading. In alternative embodiments, BESs as provided herein are modular BES, BES configuration and methods for contamination removal and energy recovery from the conversion of $CO_2$ to $CH_4$, biogas upgrading and/or the generation of current in a BES.

In alternative embodiments, BES and systems as provided herein use untreated wastewater as an input source, or inoculum.

In alternative embodiments, BES and systems as provided herein use a waste stream for the anode of the BES or a series of modular BESs. In alternative embodiments, the anode is held at an applied potential for optimized microbial behavior. The anode may remain abiotic in some configurations. In alternative embodiments, a naturally occurring microbial community is used in the anode to generate current from the contents of wastewater. Similarly, the raw wastewater may be pretreated to remove solid particulates and then used as the inoculum and anode waste stream.

In alternative embodiments, the output of a BES as provided herein is treated wastewater through the conversion of the contents of the wastewater or through the removal of the components through the selective membranes.

In alternative embodiments, an adjacent modular ion collection/removal chamber is separated from the anode via a permeable exchange membrane (for example, cation, anion and/or proton). The ion collection/removal chamber can also be separated from a modular biocathode or modular abiotic cathode via a permeable exchange membrane (for example, cation, anion and/or proton).

In alternative embodiments, the modular ion collection/removal chamber is configured to either concentrate ionic conductivity and/or concentration, and/or to increase or concentrate ammonium, nitrogen, phosphate, phosphorus, sodium, chloride, volatile fatty acids (VFAs), chemical oxygen demand (COD), and the like, in the ion collection/removal chamber or the anode/cathode chambers depending on the configuration of the permeable membranes. In alternative embodiments, the output of the ion collection/removal chamber is either treated water with a decrease in the ionic conductivity/concentration, ammonium, nitrogen, phosphate, phosphorus, sodium, chloride, VFAs, COD, and the like, or nutrient/resource rich water with an increase in ionic conductivity/concentration, ammonium, nitrogen, phosphate, phosphorus, sodium, chloride, VFAs, COD, as the like. Dependent upon the configuration of the BES, raw wastewater, pretreated wastewater, brackish water, and/or saline water may be used as inoculum or waste stream.

In alternative embodiments, the cathode chamber is used as an electron donor for processes including the biogas upgrading, and/or for the conversion of $CO_2$ to $CH_4$, via inoculation with a single methanogenic species or a mixed methanogenic culture in anoxic conditions. The cathode may also be abiotic in anoxic, hypoxic or aerobic conditions. The cathode may be held at an applied potential for optimized microbial behavior.

Figure 1:
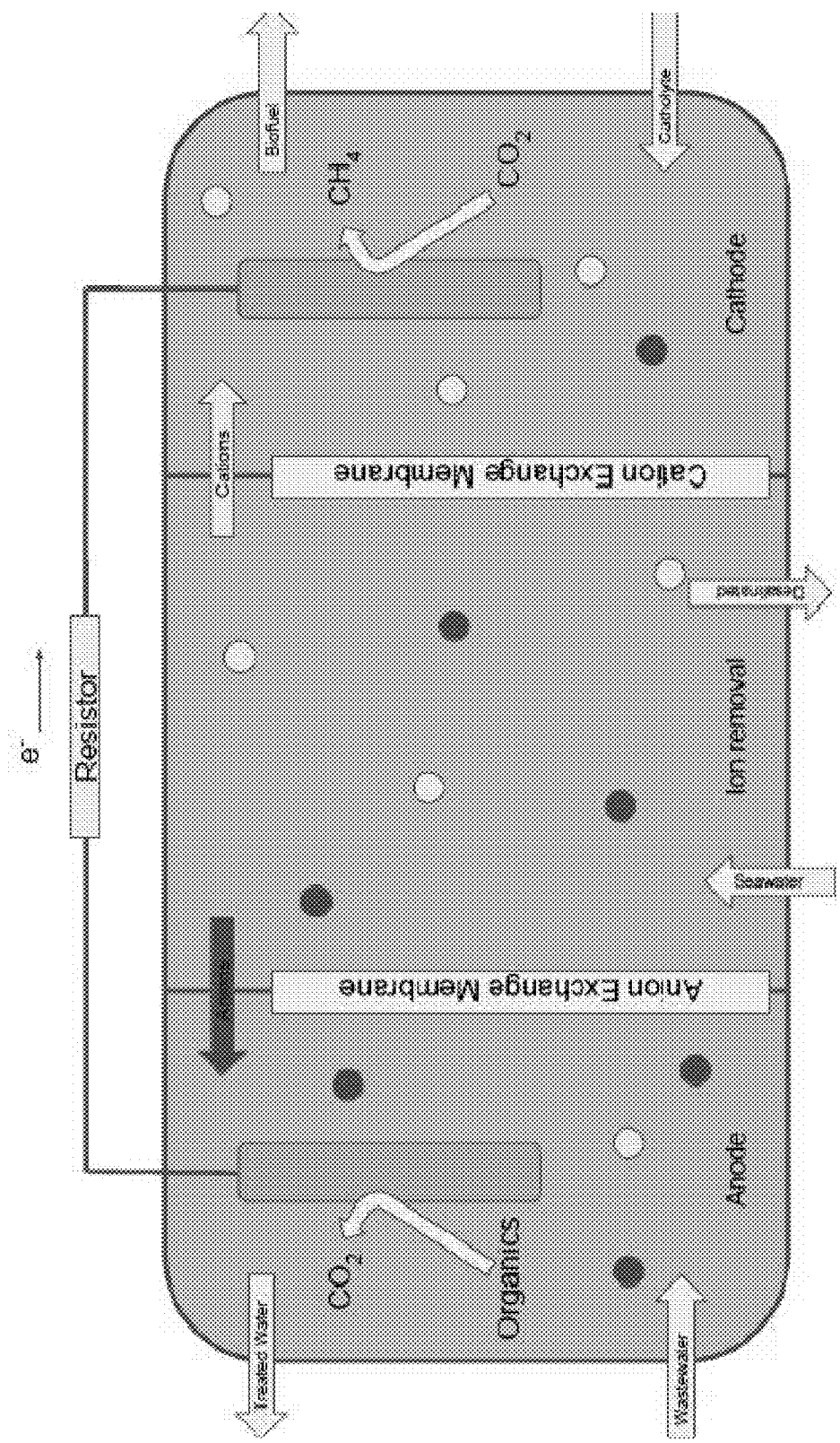
FIG. 1 schematically illustrates an exemplary BioElectrochemical System (BES) as provided herein where the ion removal configuration for the BES uses an anion exchange membrane (AEM) at the anode interface with the ion removal chamber and a cation exchange membrane (CEM) at the cathode interface, as discussed in further detail, below.

FIG. 1 schematically illustrates an exemplary BES system as provided herein where the ion removal configuration for the BES uses an anion exchange membrane (AEM) at the anode interface with the ion removal chamber and a cation exchange membrane (CEM) at the cathode interface. Anions (in red) and cations (in yellow) are able to selectively migrate across the membranes, thus concentrating the cations in the cathode and anions in the anode. This process is driven by the generation of current from a microbial community (optionally comprising a plurality of living microbes such as *Bacteria* and/or *Archaea*), and the capture of the electrons which reduce $CO_2$ to $CH_4$. In this exemplary system, the anode uses a bioelectrochemical reaction from the microbial community to oxidize organics into biomass and $CO_2$. In this exemplary system, the input can be wastewater at varying strengths and pretreatments and the output can be treated wastewater. Brackish water, seawater, saline water and other wastewaters can be used as the input for the ion removal chamber. In this exemplary system, after treatment and the selective migration of ions due to microbial processes in the cathode and anode, deionized water (desalination or ion removal) is the output.

Figure 2:
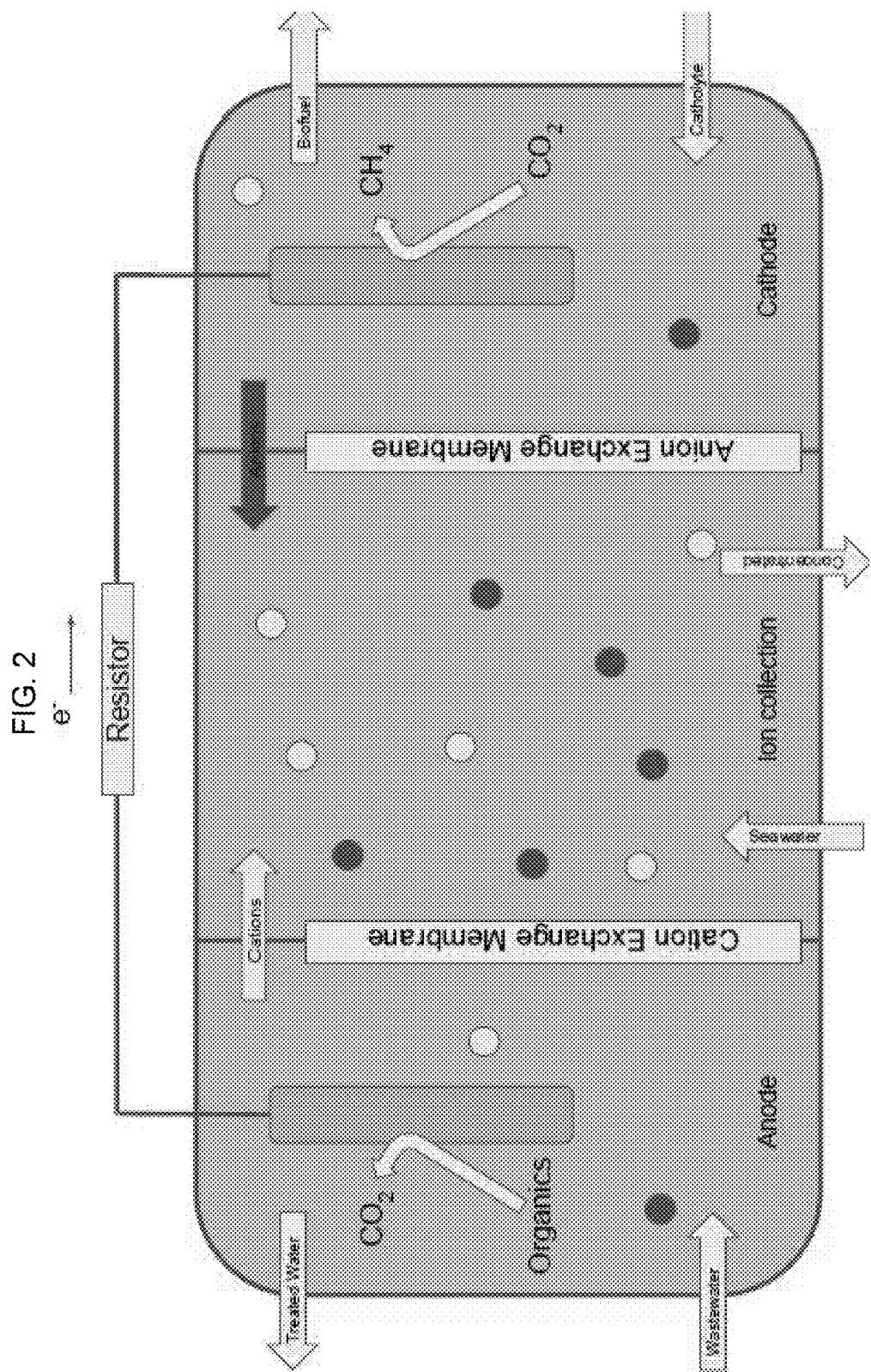
FIG. 2 schematically illustrates an exemplary BioElectrochemical System (BES) system as provided herein using a CEM at the anode interface with the ion removal chamber and an AEM at the cathode interface, as discussed in further detail, below.
Figure 3:
FIG. 3 (or FIG. 1 of Example 2): illustrates a picture of an exemplary three-chamber d-BioElectrochemical System (dBES), setup, with bioanode (left), ion removal chamber (TRC) (center), and biocathode (right).
Figure 4:
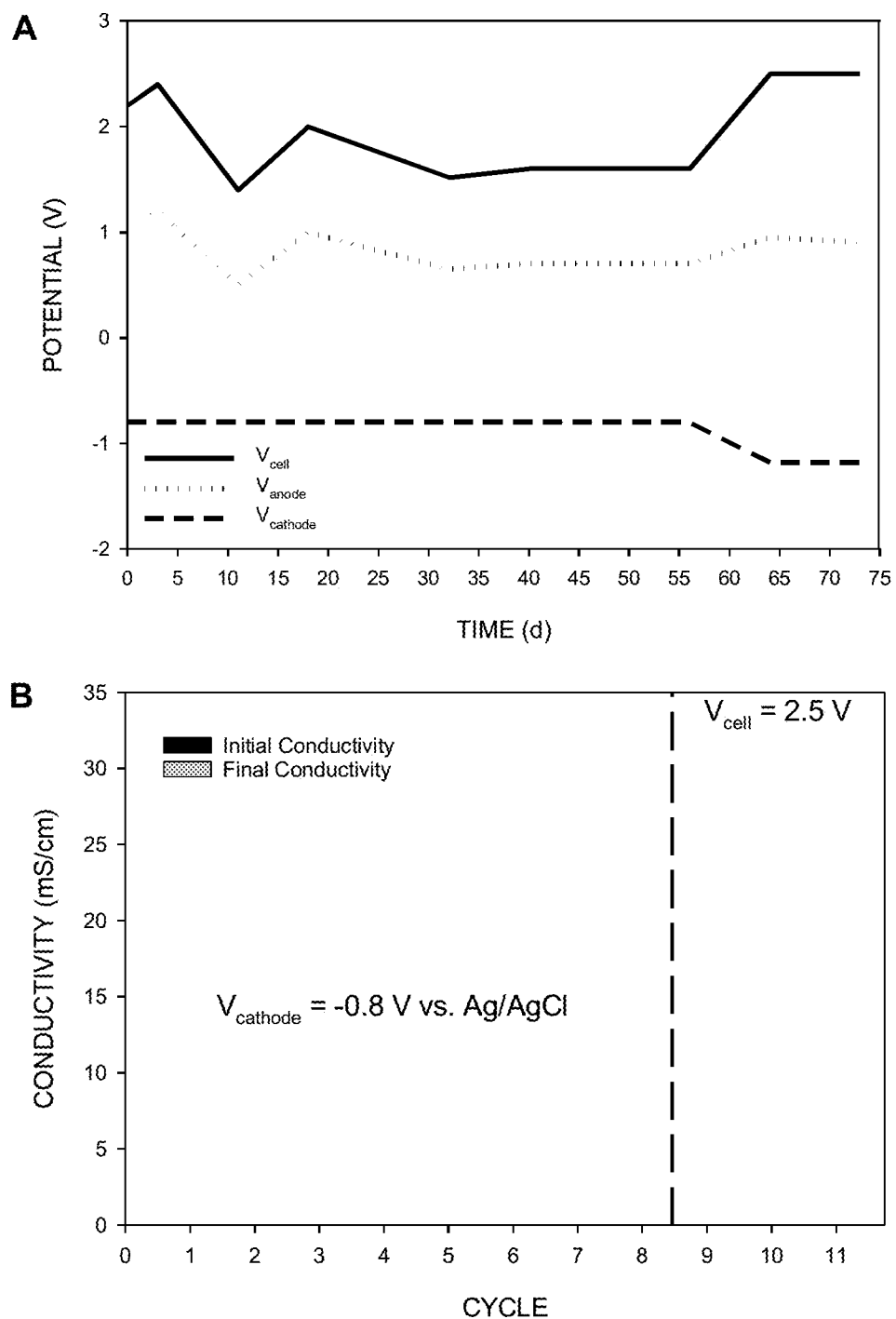
FIG. 4A-B (or FIG. 2A-B of Example 2): graphically illustrate time series of the cell, anode, and cathode potentials ($V_{cell}$, $V_{anode}$, and $V_{cathode}$, respectively) in dBES1.

FIG. 2 schematically illustrates an exemplary BES system as provided herein where the ion collection configuration for the BES uses CEM at the anode interface with the ion removal chamber and an AEM at the cathode interface. Anions (in red) and cations (in yellow) are able to selectively migrate across the membranes, thus concentrating the cations and anions in the ion collection chamber. This process is driven by the selectively permeable membranes and the potential microbial communities in the cathode and anode. The anode input can be wastewater with high concentrations of cations and the cathode input can be wastewater with high concentrations of anions. Output from both the cathode and anode can be treated/deionized water. The input for the ion collection chamber can be wastewater, seawater, brackish water or clean water, or any desired medium for the collection of the nutrients from the ion collection chamber.

Products of Manufacture and Kits

Provided are products of manufacture and kits for practicing BES systems and methods as provided herein, including optionally a potentiostat or any instrument designed to control the working electrode's potential in the electrode electrochemical cell, and a power supply or a photovoltaics device, or the product of manufacture, system or apparatus comprises a connection to an electrical grid to supply power to maintain a substantially constant electrical potential; and optionally, products of manufacture and kits can further comprise instructions for practicing methods as provided herein.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About (use of the term "about") can be understood as within 20%, 19%, 18%, 17%, 16%, 15%, 14%, 13%, 12% 11%, 10%, 9%, 8%, 7% 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 75%, 80%, 85%, 90%, 91%, 92%, 93%, 94%, 95%, 96%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

The invention will be further described with reference to the examples described herein; however, it is to be understood that the invention is not limited to such examples.

EXAMPLES

Example 1: Exemplary Product of Manufacture to Generate Biofuels

This example demonstrates that products of manufacture as provided herein are effective and can be used for saltwater desalination, wastewater treatment and/or biogas upgrading of $CO_2$ to $CH_4$.

An exemplary reactor as provided herein comprises a glass bottle reactor consisting of three chambers. The chambers are separated by an anion exchange membrane (AEM) and a cathode exchange membrane (CEM) as depicted in FIG. 1. The volumes for the anode, ion removal and cathode chamber were 140 mL, 190 mL, and 140 mL, respectively. The glassware bottles were closed with rubber stoppers, with the anode and cathode chambers having a Ag/AgCl reference electrode and stainless steel rod attached to the rubber stopper. The reference electrode and stainless-steel electrode are positioned in the rubber stopper such that they are able to be submerged in the liquid media of the chamber, without touching the bottom of the reactor and while also leaving room for the anode and cathode to have a headspace for gas collection. A carbon felt is fastened to the stainless-steel electrode in the anode and cathode compartments for the support of electroactive microbial communities.

In this exemplary reactor, the anode and cathode were inoculated with microorganisms to accomplish organic material oxidation in the anode and the conversion of $CO_2$ to $CH_4$ in the cathode. The reactor was maintained on a batch media replacement weekly routine, filling the anode and cathode to 110 mL and the ion removal chamber to 145 mL.

All chambers were filled with a rich media containing: 14.2 g/L $NaH_2PO_4 \cdot H_2O$, 13.8 g/L $Na_2HPO_4$, 0.31 g/L $NH_4Cl$, 0.13 g/L KCl, 12.5 mL/L mineral stock (1.5 g/L nitrilotriacetic acid, 3 g/L $MgSO_4 \cdot 7H_2O$, 0.5 g/L $MnSO_4 \cdot H_2O$, 1 g/L NaCl, 0.1 g/L $FeSO_4 \cdot 7H_2O$, 0.1 g/L $CoCl_2 \cdot 6H_2O$, 0.1 g/L $CaCl_2$, 0.1 g/L $ZnSO_4 \cdot 7H_2O$, 0.01 g/mL $CuSO_4 \cdot 5H_2O$, 0.01 g/L $AlK(SO_4)_2 \cdot 12H_2O$, 0.01 g/L $Na_2MnO_4 \cdot 2H_2O$), and 2.5 mL/L vitamin stock (0.01 g/L folic acid, 0.05 g/L pyridoxine hydrochloride, 0.025 g/L riboflavin, 0.01 biotin, 0.025 thiamine, 0.025 g/L nicotinic acid, 0.025 calcium pantothenate, 0.0005 g/L vitamin B12, 0.025 p-aminobenzoic acid, 0.025 thioctic acid).

On a weekly basis, media was replaced, and the anode was fed 3 mL of 0.1M sodium acetate then flushed $N_2$ gas. On the same feeding schedule, the ion removal chamber was flushed with $N_2$ gas, and the cathode chamber was flushed with $CO_2$ gas after the replacement of their media.

At the end of each 7-day feeding cycle and before the replacement of media, pressure was recorded using a pressure transducer. Voltage measurements were also taken for the potentials between the anode stainless-steel electrode and its Ag/AgCl reference electrode, the cathode stainless-steel electrode and its Ag/AgCl, and the cathode stainless-steel electrode and anode stainless-steel electrode. The composition of the headspace gas ($CO_2$, $CH_4$, $H_2$, $N_2$) from each chamber was recorded and analyzed via gas chromatography (GC) with thermal conductivity (TCD). pH and conductivity were recorded using pH and conductivity probes. Recorded data is presented in Table 1.

| Date | Initial ion removal chamber Conductivity (mS/cm) | Final ion removal chamber Conductivity (mS/cm) | Percent Ionic removal | Total mmol CH4 from CO2 |
|---|---|---|---|---|
| Apr. 9, 2021 | 10.81 | 2.4 | 77.80% | 0.00E+0 |
| Apr. 12, 2021 | 10.81 | 6.7 | 38.02% | 2.45E−03 |
| Apr. 19, 2021 | 10.81 | 10.02 | 7.31% | 3.01E−03 |
| Apr. 26, 2021 | 10.81 | 10.74 | 0.65% | 1.75E−02 |
| May 10, 2021 | 10.81 | 9.98 | 7.68% | 1.71E−02 |
| May 18, 2021 | 10.81 | 10.4 | 3.79% | 2.40E−02 |
| May 26, 2021 | 10.81 | 10.44 | 3.42% | 2.48E−02 |
| Jun. 1, 2021 | 10.81 | 10.38 | 3.98% | 1.06E−02 |
| Jun. 9, 2021 | 10.81 | 7.1 | 34.32% | 2.91E−01 |
| Jun. 16, 2021 | 10.81 | 7.1 | 34.32% | 8.74E−02 |
| Jun. 23, 2021 | 32.01 | 6.42 | 79.94% | 1.48E−01 |

Data provided in Table 1 demonstrate the efficacy of methods for deionization of the ion removal chamber and the conversion of $CO_2$ to $CH_4$ in a three-chamber bioreactor as provided herein. The initial and final conductivity of the ion removal chamber shows a decrease in ionic conductivity in the ion removal chamber over the course of a week ranging from 0.65% to 79.94% ionic removal upon optimization. Additionally, the cathode was flushed solely with $CO_2$, thus all $CH_4$ production over the week-long feeding cycle (total mmol $CH_4$ from $CO_2$) can be accredited to the microbial community in the cathode.

Example 2: Exemplary Bioelectrochemical Systems for Desalination with Energy Recovery This example demonstrates exemplary products of manufacture as provided herein, and that these products of manufacture are effective as bioelectrochemical systems for desalination with energy recovery.

Bioelectrochemical systems (BES) convert carbon dioxide ($CO_2$) to methane ($CH_4$), a carbon-neutral energy source, and produce a small electrical current through the use of applied microorganisms in the wastewater treatment process. The objective of this research is to develop the first comprehensive model of a BES, titled BESM1, to be employed in the fields of energy and nutrient recovery, groundwater monitoring, or chemical/pharmaceutical production. Previously, the only available models for this field of study are for anaerobic digestion, ADM1, or microbial fuel cells, therefore to establish a foundation for BESM1, data was collected in a laboratory for over six years from multiple BES reactors and utilized in an adapted modeling framework from ADM1. The collected data was used to incorporate initial conditions along with kinetic rates and organic compound production/transportation differentials to display a graphical visualization of the processes occurring in the system. Developed in Matlab, this model can be used as a mathematical optimization tool to predict outcomes based on various conditions (i.e., different gas compositions, applied potential, etc.). As a result, BESM1 determines ideal conditions for peak efficiency within BES technology that has yet to be modeled until now.

Energy-recovery BESs are typically operated with a fixed cathode potential ($V_{cathode}$) that is held at a sufficiently negative voltage (versus an adjacent reference electrode) to drive the desired cathode reaction (e.g., $CO_2$ to $CH_4$). This configuration allows for the anode potential ($V_{anode}$) to fluctuate. When active electrogenic microbes are present at the anode, the $V_{anode}$ will increase and decrease in accordance with substrate availability. Subsequently, the overall cell potential ($V_{cell}$), which represents the voltage between the anode and cathode, will fluctuate in tandem with $V_{anode}$. Although this approach to applying a potential to the BES is effective for energy-recovery setups, it may not be ideal for a dBES because the driving force for ion separation is ionic charge attraction to the anode or cathode. Thus, an alternate approach is to operate the dBES with a fixed $V_{cell}$, which allows the $V_{anode}$ and $V_{cathode}$ to fluctuate in tandem but maintains a constant voltage between the anode and cathode. However, it is not known how the two applied potential configurations influence the rate of ion removal or the biocathode/bioanode processes in a dBES. Therefore, one objective of this study is to compare dBES performance when the potential is applied by holding either the $V_{cathode}$ or $V_{cell}$ constant.

Materials and Methods

BES Setup

Inoculated with *S. oneidensis*, anodes as provided and used herein degrade organics in wastewater to generate a current for biogas upgrading and desalination. The ion removal chamber (IRC) will take advantage of the voltage difference between the Anode and Cathode to deionize the chamber based on exchange membranes which selectively allow charged ions to move into the Anode or Cathode.

In the Cathode, *M. maripaludis* converts $CO_2$ into the biofuel $CH_4$, with potential downstream applications for gas to liquid biofuel production.

dBES1-IRC conductivities: 10.81 mS/cm or 32.01 mS/cm.

To better understand how two duplicate dBESs with a fixed cell potential of 2.5 V remove ions from water in the IRC that contains: i) 10 g/L $NH_4Cl$ (conductivity 41.01 mS/cm) in Cycle #1; ii) 12 g/L NaCl (conductivity 38.55 mS/cm) in Cycle #2; iii) 8 g/L NaCl (conductivity 12.82 mS/cm) in Cycle #3; iv) 6 g/L NaCl (conductivity 8.49 mS/cm) in Cycle #4; and v) 20 g/L $K_2HIPO_4$ (conductivity 14.29 mS/cm) in Cycle #5. dBES2, dBES3-Feeding and IRC replacement at 0, 50.9, 73.28, 99.48, 123.85.

Cycle 1: 10 g/L $NH_4Cl$ (41.01 mS/cm)
Cycle 2: 12 g/L NaCl (38.55 mS/cm)
Cycle 3: 8 g/L NaCl (12.82 mS/cm)
Cycle 4: 6 g/L NaCl (8.49 mS/cm)
Cycle 5: 20 g/L $K_2HIPO_4$ (14.29 mS/cm)

Results and Discussion

Effect on dBES1 performance of holding cathode or cell potential constant dBES1 was operated for a total of 11 consecutive cycles, with the initial cycle 3 days in length and the remaining cycles 7 days in length (Table 1). The first 8 cycles were operated by holding the cathode potential at a constant −0.80 V vs. Ag/AgCl, while the last 3 cycles were operated by holding the cell potential constant at 2.5 V. During the first dBES1 cycle, the ion removal chamber (IRC) achieved a 77% reduction in conductivity over the course of 3 days. However, the ion removal efficiency declined during the second cycle and third cycles, which only achieved 40% and 7% conductivity removal, respectively, over a 7 day period. The IRC achieved an ion removal efficiency that ranged between 2.1% and 7.5% for cycles 3 to 8. The resulting poor performance of the IRC was thought to be due to the fluctuation in $V_{cell}$ over time. With a fixed $V_{cathode}$, $V_{anode}$ and $V_{cell}$ are allowed to fluctuate, which may result in a decline in the driving force for ion transport across an ion exchange membrane. The principle of electroneutrality in water requires that the rate of anion charge transport across one membrane (e.g., anions crossing an anion exchange membrane towards the anode) must be equal to the rate of cation charge transport across the opposite membrane (e.g., cations across a cation exchange membrane towards the cathode). Thus, the total rate of ion removal is limited by the slowest rate of charge transport (i.e., cations or anions) across a membrane.

The decline in IRC ion removal efficiency across cycles 1-3 (from 77% conductivity removal in Cycle 1 to 7% in Cycle 3) indicated a slowing rate of ion transport across the anion and cation exchange membranes following start up. Assuming the cation and anion exchange membranes facilitated a similar rate of charge transfer (and that overpotentials in the electrical circuit were perfectly balanced), the potential of the IRC bulk liquid was theoretically equal to the mean potential of the anode and cathode. For example, in a batch-fed dBES, if $V_{cathode}$ was fixed at −0.80 V vs. Ag/AgCl, $V_{anode}$ was +0.80 V vs. Ag/AgCl, and $V_{cell}$ was 1.60 V, the potential in the well-mixed IRC bulk liquid would be 0.00 V vs. Ag/AgCl. The charge concentration gradient across the membrane drives ion transport; thus, when $V_{cathode}$ is held constant, the decline in $V_{anode}$ over time, often due to declining anode substrate availability, leads to a decline in $V_{cell}$, and a progressively slower rate of ion transport across the membrane.

With the dBES1 cathode potential fixed at −0.80 V vs. Ag/AgCl, the anode and cell potentials stabilized at 0.74±0.03 V vs. Ag/AgCl and 1.59±0.03 V, respectively (FIG. 2A), during Cycles 3 to 8.

During Cycles 9-11, dBES1 was operated with a 2.5 V cell potential (anode to cathode), instead of a fixed cathode potential. The theoretical median potential was 1.25 V for the IRC bulk liquid during these cycles, assuming that the cation and anion exchange membranes produced a similar rate of charge transfer and overpotentials in the electrical circuit were balanced.

SUMMARY

Setting $V_{cell}$ instead of $V_{cathode}$ led to improvements in desalination and biocathode $CH_4$ production.

Higher $V_{cell}$ voltages resulted in more deionization from the desalination cell.

A sufficient ratio of anode and cathode liquid volume to IRC liquid volume is important to avoid high ion concentrations in the anode and cathode, which may lead to disruption of the biological community. For example, small bioanode and biocathode liquid volumes, relative to the volume of the IRC, may result in high ionic strength in the anode and cathode compartments.

Performance of dBES2 and dBES3 at a Fixed Cell Potential

At a fixed cell potential (e.g., 2.5 V), the biocathode potentials were favorable for electrotrophic methanogenesis (−0.7 V vs Ag/AgCl reference)

As electroactive biofilm matured, the bioanode potentials increased (i.e., became more positive).

Comparison of cyclic voltammetry scans of dBES2 and dBES3 over time indicated a growth in electroactive biofilm at the anode and cathode Upon startup, the cathode had a low cathode capture efficiency, which was likely due to poor biofilm coverage and/or the use of a pure culture instead of a more robust mixed culture.

Due to the relatively small volume ratio of anolyte and catholyte to electrolyte in the IRC, a rapid increase in IRC initial conductivity from 10 mS/cm to above 50 mS/cm resulted in a disruption to the anode and cathode biofilms. This result may be avoided by adjusting chamber volumes and system architecture.

CONCLUSIONS

This study demonstrated that using devices and methods as provided herein desalination can be coupled with energy recovery in the form of $H_2$ or $CH_4$ production in a BES. In these exemplary systems, higher desalination efficiency and higher $CH_4$ production was observed when $V_{cell}$ was held constant at 2.5 V, instead of applying a fixed cathode potential. An exemplary system may also be used for the removal of other ions, such as $NH_4^+$.

Thus, we have demonstrated organics oxidation, desalination, and $H_2/CH_4$ biogas recovery as a feasible biotechnological solution to reduce energy requirements for ion removal.

TABLE 1

Experimental conditions for dBES1 feeding cycles and IRC ion removal for each cycle.

| Cycle | Cycle Length (d) | Initial Conductivity (mS/cm) | IRC Ion Removal (%) | Applied Potential Method | Fixed Potential (Electrode) |
|---|---|---|---|---|---|
| 1 | 3 | 10.8 | 77 | Fixed cathode potential | −0.80 vs. Ag/AgCl (cathode) |
| 2 | 7 | 10.8 | 40 | Fixed cathode potential | −0.80 vs. Ag/AgCl (cathode) |
| 3 | 7 | 10.8 | 7 | Fixed cathode potential | −0.80 vs. Ag/AgCl (cathode) |
| 4 | 7 | 10.8 | 0 | Fixed cathode potential | −0.80 vs. Ag/AgCl (cathode) |
| 5 | 7 | 10.8 | 7 | Fixed cathode potential | −0.80 vs. Ag/AgCl (cathode) |
| 6 | 7 | 10.8 | 5 | Fixed cathode potential | −0.80 vs. Ag/AgCl (cathode) |
| 7 | 7 | 10.8 | 5 | Fixed cathode potential | −0.80 vs. Ag/AgCl (cathode) |
| 8 | 7 | 10.8 | 5 | Fixed cathode potential | −0.80 vs. Ag/AgCl (cathode) |
| 9 | 7 | 10.8 | 36 | Fixed cell potential | 2.5 V (cell) |

TABLE 1-continued

Experimental conditions for dBES1 feeding cycles and IRC ion removal for each cycle.

| Cycle | Cycle Length (d) | Initial Conductivity (mS/cm) | IRC Ion Removal (%) | Applied Potential Method | Fixed Potential (Electrode) |
|---|---|---|---|---|---|
| 10 | 7 | 10.8 | 35 | Fixed cell potential | 2.5 V (cell) |
| 11 | 7 | 32.0 | 81 | Fixed cell potential | 2.5 V (cell) |

TABLE 2

Cathode capture efficiency (CCE) for dBES2 and dBES3 over Cycles #1-5

| Cycle | IRC Initial Condition | dBES2 (%) | dBES3 (%) |
|---|---|---|---|
| 1 | 10 g/L NH$_4$Cl | 2.7 | 3.2 |
| 2 | 12 g/L NaCl | 7.0 | 7.3 |
| 3 | 8 g/L NaCl | 5.7 | 6.2 |
| 4 | 6 g/L NaCl | 7.8 | 12.2 |
| 5 | 20 mM phosphate buffer | 9.6 | 9.2 |

REFERENCES

Dykstra, C. M., Pavlostathis, S. G., 2017 a. Evaluation of gas and carbon transport in a methanogenic bioelectrochemical system (BES). Biotechnology and Bioengineering 114 (5), 961-969.

Dykstra, C. M., Pavlostathis, S. G., 2017 b. Methanogenic biocathode microbial community development and the role of *Bacteria*. Environmental Science and Technology 51 (9), 5306-5316.

Dykstra, C. M., Pavlostathis, S. G., 2017 c. Zero-valent iron enhances biocathodic carbon dioxide reduction to methane. Environmental Science and Technology 51 (21), 12956-12964.

Dykstra, C. M., Cheng, C., Pavlostathis, S. G., 2020. Comparison of carbon dioxide with anaerobic digester biogas as a methanogenic biocathode feedstock. Environmental Science and Technology, 54 (14), 8949-8957.

Dykstra, C. M., Pavlostathis, S. G., 2021. Hydrogen sulfide affects the performance of a methanogenic bioelectrochemical system for biogas upgrading. Water Research, 200, 117268.

A number of embodiments of the invention have been described. Nevertheless, it can be understood that various modifications may be made without departing from the spirit and scope of the invention. Accordingly, other embodiments are within the scope of the following claims.

What is claimed is:

1. A product of manufacture, a system or an apparatus comprising an anode chamber, an ion removal chamber and a cathode chamber,
   wherein the product of manufacture, system or apparatus has an ion removal configuration wherein an anion exchange membrane (AEM) is at an anode interface with the ion removal chamber and a cation exchange membrane (CEM) at a cathode interface with the ion removal chamber resulting in anions selectively flowing or migrating into the anode chamber and cations selectively flowing or migrating into the cathode chamber, thereby concentrating anions in the anode chamber and cations in the cathode chamber,
   wherein the anode chamber and the cathode chamber comprises a biological or a microbial community comprising living methanogenic *Bacteria* or methanogenic *Archaea*.

2. A method for oxidizing raw or pretreated wastewater comprising:
   contacting raw or pretreated wastewater with a biological or microbial community in an anode environment using a product of manufacture, system or apparatus as set forth in claim 1,
   and biogas or $CO_2$ is upgraded to generate $CH_4$ or biofuel in a biocathode and the removal of ions in a chamber separated by a membrane.

3. A method for oxidizing raw or pretreated wastewater through a biological or microbial community in an anode for the use of chemical reduction in a biocathode and the removal of ions in a chamber separated by a membrane comprising:
   contacting raw or pretreated wastewater with a biological or microbial community in an anode environment using a product of manufacture, system or apparatus as set forth in claim 1.

4. A method for oxidizing the raw or pretreated wastewater through a biological or microbial community in an anode for the removal of ions in a chamber separated by a membrane, comprising:
   contacting raw or pretreated wastewater with a biological or microbial community in an anode environment using a product of manufacture, system or apparatus as set forth in claim 1.

5. A method for oxidizing a raw or pretreated wastewater through a biological or microbial community in an anode for the use of biogas upgrading in a biocathode and the concentration of ions in a chamber separated by a membrane comprising:
   contacting raw or pretreated wastewater with a biological or microbial community in an anode environment using a product of manufacture, system or apparatus as set forth in claim 1.

6. A method for oxidizing a raw or pretreated wastewater through a biological or microbial community in an anode for the concentration of ions in a chamber separated by a membrane, comprising:
   contacting raw or pretreated wastewater with a biological or microbial community in an anode environment using a product of manufacture, system or apparatus as set forth in claim 1.

7. A method for water deionization and desalination comprising:
   contacting water to be deionized and desalinated with a biological or microbial community in an anode environment using a product of manufacture, system or apparatus as set forth in claim 1.

8. The method of claim 7, wherein the biological or microbial community comprise methanogenic *Bacteria* and methanogenic *Archaea*.

9. The method of claim 7, wherein input for the ion removal chamber comprises brackish water, seawater, saline water or a treated or untreated wastewater.

10. The method of claim 7, wherein output from the ion removal chamber comprises deionized and/or desalinated water.

11. The method of claim 7, wherein the wastewater comprises treated or untreated wastewater, or comprises raw or pretreated wastewater, or comprises diluted or undiluted wastewater.

12. The method of claim 7, wherein the wastewater flows into the anode chamber and treated water flows out of the anode chamber.

13. The method of claim 7, wherein the water comprises salt water.

14. The product of manufacture, a system or an apparatus comprising an anode chamber of claim 1, wherein:
   (a) capture of electrons by the plurality of living microbes in the cathode chamber reduces $CO_2$ to $CH_4$,
   (b) anode chamber organic compounds are oxidized into biomass and $CO_2$,
   (c) a wastewater flows into the anode chamber and treated water flows out of the anode chamber,
   (d) a catholyte is flowed into the cathode chamber and $CH_4$ biofuel flows out of the cathode chamber,
   (e) the cathode is held at a constant electrical potential, and the product of manufacture, system or apparatus comprises and is operably linked to a potentiostat to maintain a constant cathode potential, or any instrument designed to control the working electrode's potential in the electrode electrochemical cell, and a power supply or a photovoltaics device, or the product of manufacture, system or apparatus comprises a connection to an electrical grid to supply power to maintain a constant electrical potential; or
   (f) the product of manufacture, system or apparatus runs, or is configured to set to run or operate, at operating voltages comprising:
      (i) a cathode potential ranging from between about −0.2 V vs. Ag/AgCl to about −1.5 V vs. Ag/AgCl;
      (ii) an anode potential ranging from between about 0.0 V vs. Ag/AgCl to about 2.5 V vs. Ag/AgCl; or
      (iii) a cell potential ranging from between about 0.2 V to 5.0 V.

15. The method of claim 1, wherein the cathode has an operating potential of about −0.7 V vs. Ag/AgCl, −0.6 V vs. Ag/AgCl or −0.5 V vs. Ag/AgCl.

16. The method of claim 1, wherein the anode has an operating potential of about 1.2 V vs. Ag/AgCl, 1.1 V vs. Ag/AgCl or 1.3 V vs. Ag/AgCl.

17. The method of claim 1, wherein a cell potential is about 2.5 V, 2.4 V, 2.6 V, 2.3 V or 2.7 V.

18. A product of manufacture, a system or an apparatus comprising an anode chamber, an ion collection chamber and a cathode chamber,
   wherein the product of manufacture, system or apparatus has an ion removal configuration wherein an anion exchange membrane (AEM) is at a cathode interface with the ion collection chamber and a cation exchange membrane (CEM) at an anode interface with the ion collection chamber resulting in anions and cations selectively flowing or migrating into the ion collection chamber, thereby concentrating ions in the ion collection chamber,
   wherein the anode chamber and the cathode chamber comprises a biological or a microbial community comprising living methanogenic *Bacteria* or methanogenic *Archaea*.

19. The product of manufacture, a system or an apparatus comprising an anode chamber of claim 18, wherein:
   (a) the biological or microbial community comprises a plurality of living microbes comprise living methanogenic *Bacteria* and/or *Archaea*,
   (b) capture of electrons by the plurality of living microbes in the cathode chamber reduces $CO_2$ to $CH_4$,
   (c) anode chamber organic compounds are oxidized into biomass and $CO_2$,
   (d) a treated or untreated, or raw or pretreated wastewater, or diluted or undiluted wastewater, flows into the anode chamber and treated water flows out of the anode chamber,
   (e) a catholyte is flowed into the cathode chamber and $CH_4$ biofuel flows out of the cathode chamber,
   (f) input for the ion collection chamber comprises brackish water, seawater, saline water or a treated or untreated wastewater, and output from the ion collection chamber comprises concentrated ions,
   (g) the cathode is held at a constant electrical potential, or a constant electrical potential, and the product of manufacture, system or apparatus comprises and is operably linked to a potentiostat to maintain a constant cathode potential, a power supply or photovoltaics device or comprises a connection to an electrical grid to supply power, or
   (h) the product of manufacture, a system or an apparatus comprising an anode chamber is configured to set to run or operate, at operating voltages comprising:
      (i) a cathode potential ranging from between about −0.2 V vs. Ag/AgCl to about −1.5 V vs. Ag/AgCl;
      (ii) an anode potential ranging from between about 0.0 V vs. Ag/AgCl to about 2.5 V vs. Ag/AgCl: or
      (iii) a cell potential ranging from between about 0.2 V to 5.0 V.

20. A method for oxidizing raw or pretreated wastewater comprising: contacting raw or pretreated wastewater with a biological or microbial community in an anode environment using a product of manufacture, system or apparatus as set forth in claim 18, and biogas or $CO_2$ is upgraded to generate $CH_4$ or biofuel in a biocathode and the removal of ions in a chamber separated by a membrane.

21. A method for oxidizing raw or pretreated wastewater through a biological or microbial community in an anode for the use of chemical reduction in a biocathode and the removal of ions in a chamber separated by a membrane comprising: contacting raw or pretreated wastewater with a biological or microbial community in an anode environment using a product of manufacture, system or apparatus as set forth in claim 18.

22. A method for oxidizing the raw or pretreated wastewater through a biological or microbial community in an anode for the removal of ions in a chamber separated by a membrane comprising: contacting raw or pretreated wastewater with a biological or microbial community in an anode environment using a product of manufacture, system or apparatus as set forth in claim 18.

23. A method for oxidizing a raw or pretreated wastewater through a biological or microbial community in an anode for the use of biogas upgrading in a biocathode and the concentration of ions in a chamber separated by a membrane comprising: contacting raw or pretreated wastewater with a biological or microbial community in an anode environment using a product of manufacture, system or apparatus as set forth in claim 18.

24. A method for oxidizing a raw or pretreated wastewater through a biological or microbial community in an anode for the concentration of ions in a chamber separated by a membrane, comprising: contacting raw or pretreated wastewater with a biological or microbial community in an anode environment using a product of manufacture, system or apparatus as set forth in claim 18.

25. A method for water deionization and desalination comprising contacting water to be deionized and desalinated with a biological or microbial community in an anode environment using a product of manufacture, system or apparatus as set forth in claim 18.

* * * * *